United States Patent
Entezari et al.

(10) Patent No.: US 11,989,770 B2
(45) Date of Patent: May 21, 2024

(54) PERSONALIZED RECOMMENDATION OF COMPLEMENTARY ITEMS TO A USER FOR INCLUSION IN AN ORDER FOR FULFILLMENT BY AN ONLINE CONCIERGE SYSTEM BASED ON EMBEDDINGS FOR A USER AND FOR ITEMS

(71) Applicant: Maplebear Inc., San Francisco, CA (US)

(72) Inventors: Negin Entezari, Riverside, CA (US); Sharath Rao Karikurve, Berkeley, CA (US); Shishir Kumar Prasad, Fremont, CA (US); Haixun Wang, Palo Alto, CA (US)

(73) Assignee: Maplebear Inc., San Francisco, CA (US)

( * ) Notice: Subject to any disclaimer, the term of this patent is extended or adjusted under 35 U.S.C. 154(b) by 240 days.

(21) Appl. No.: 17/406,027

(22) Filed: Aug. 18, 2021

(65) Prior Publication Data
US 2023/0056148 A1 Feb. 23, 2023

(51) Int. Cl.
*G06Q 30/00* (2023.01)
*G06Q 10/087* (2023.01)
*G06Q 30/0601* (2023.01)

(52) U.S. Cl.
CPC ....... *G06Q 30/0633* (2013.01); *G06Q 10/087* (2013.01)

(58) Field of Classification Search
CPC .................................................. G06Q 30/00
See application file for complete search history.

(56) References Cited

U.S. PATENT DOCUMENTS

| | | | | |
|---|---|---|---|---|
| 11,645,559 B2 * | 5/2023 | Yalla | ................... | G06F 16/9535 706/12 |
| 2011/0179081 A1 * | 7/2011 | Ovsjanikov | ......... | G06F 16/9538 707/769 |
| 2014/0180760 A1 * | 6/2014 | Karatzoglou | ...... | G06Q 30/0269 705/7.29 |

(Continued)

OTHER PUBLICATIONS

Volker, Tresp, "A three-way model for collective learning on Multi-relational data", resear4chgate.co, dated Jan. 2011 (Year: 2011).*

(Continued)

*Primary Examiner* — Mark A Fadok
(74) *Attorney, Agent, or Firm* — Fenwick & West LLP (57) ABSTRACT

An online concierge shopping system identifies candidate items to a user for inclusion in an order based on prior user inclusion of items in orders and items currently included in the order. From a multi-dimensional tensor generated from cooccurrences of items in orders from various users, the online concierge system generates item embeddings and user embeddings in a common latent space by decomposing the multi-dimensional tensor. From items included in an order, the online concierge system generates an order embedding from item embeddings of the items included in the order. Scores for candidate items are determined based on similarity of item embeddings for the candidate items to the order embedding. Candidate items are selected based on their scores, with the selected candidate items identified to the user.

20 Claims, 6 Drawing Sheets

(56) References Cited

U.S. PATENT DOCUMENTS

| | | | |
|---|---|---|---|
| 2017/0168991 A1* | 6/2017 | Baskaran | G06F 17/16 |
| 2018/0158078 A1* | 6/2018 | Hsieh | G06N 20/00 |
| 2019/0205905 A1* | 7/2019 | Raghunathan | G06F 18/214 |
| 2022/0101093 A1* | 3/2022 | Hildebrandt | G06N 3/042 |

OTHER PUBLICATIONS

Rahimi et al., Tens embedding: A Tensor-based document embedding method, Elsevier.com, dated Jul. 15, 2020. (Year: 2020).*

* cited by examiner

PERSONALIZED RECOMMENDATION OF COMPLEMENTARY ITEMS TO A USER FOR INCLUSION IN AN ORDER FOR FULFILLMENT BY AN ONLINE CONCIERGE SYSTEM BASED ON EMBEDDINGS FOR A USER AND FOR ITEMS

BACKGROUND

This disclosure relates generally to ordering items through an online concierge system, and more specifically to identifying one or more items to include in an order based on items currently included in the order.

In current online concierge systems, shoppers (or "pickers") fulfill orders at a physical warehouse, such as a retailer, on behalf of customers as part of an online shopping concierge service. An online concierge system provides an interface to a customer identifying items offered by a physical warehouse and receives selections of one or more items for an order from the customer. In current online concierge systems, the shoppers may be sent to various warehouses with instructions to fulfill orders for items, and the shoppers then find the items included in the customer order in a warehouse.

When placing an order through an online concierge system, a user typically has to navigate through a large number of items offered by a warehouse for inclusion in the order. Often, navigating through catalog of items offered by a warehouse is time-intensive, and potentially confusing, for the user. To simplify order creation for users, an online concierge system may include a recommendation system to identify items from a warehouse for inclusion in an order. Many conventional recommendation systems are based on a user's purchase history and recommend items for purchase to a user based on the user's purchase history from prior orders, allowing users to more readily identify relevant items for inclusion in an order.

While conventional recommendation systems account for items previously purchased by a user, accounting for frequencies with which various items were purchased by the user or interactions between users and items, conventional recommendation systems fail to account for contextual information about a current order by the user when recommending items. For example, conventional recommendation systems are unable to account for items currently included in an order being created by a user. Additionally, leveraging prior orders by a user prevents a recommendation system from identifying items the user has not previously purchased but that may be relevant to items included in a current order from the user.

SUMMARY

When a user is identifying items from a warehouse for inclusion in an order via an online concierge system, the user often provides search queries from the user through an interface. The search query includes one or more search terms for identifying one or more items the user seeks to purchase via the online concierge system. The online concierge system identifies items having attributes matching or similar to one or more of the search terms, allowing the user to select items for inclusion in the order. While this allows the user to identify specific items, use of search terms to identify items to a user limits the ability of the online concierge system to prospectively identify items to the user that the user is likely to purchase, which may increase a number of orders or a number of items in orders received from the user.

To simplify inclusion of items in an order for fulfillment by the online concierge system, the online concierge system obtains an inventory of items offered by one or more warehouses. In some embodiments, the online concierge system obtains an inventory from each warehouse, with an inventory from a warehouse identifying items offered by the warehouse. The inventory includes different entries, with each entry including information identifying an item (e.g., an item identifier, an item name) and one or more attributes of the item. Example attributes of an item include: one or more keywords, a brand offering the item, a manufacturer of the item, a type of the item, a price of the item, a quantity of the item, a size of the item and any other suitable information. Additionally, one or more attributes of an item may be specified by the online concierge system for the item and included in the entry for the item in the inventory. Example attributes specified by the online concierge system for an item include: a category for the item, one or more sub-categories for the item, and any other suitable information for the item.

From the information about various items in the inventory and information stored by the online concierge system describing prior interactions by users of the online concierge system selecting items and information about users of the online concierge system, the online concierge system generates a tensor from cooccurrences of various items in orders from users. Through one or more tensor decomposition methods, the online concierge system generates item embeddings for various items and user embeddings from the tensor. In various embodiments, the online concierge system maintains a three mode tensor with dimensions for users and products. Each element of the three mode tensor corresponds to an identifier of a user, an identifier of an item, and an identifier of another item. A value of the three mode tensor for an identifier of the user, an identifier of the item, and the identifier of the additional item specifies a number of times the user corresponding to the identifier has included both the item and the additional item in an order that was fulfilled by the online concierge system. This allows the online concierge system to track co-occurrences of pairs of products in orders fulfilled for various users, while maintaining information describing inclusion of items in orders for different users.

The online concierge system decomposes the three mode tensor of user identifier, item identifier, and item identifier. In some embodiments, the online concierge system performs any suitable tensor decomposition method, or combination of tensor decomposition methods to the three mode tensor (e.g., Tucker decomposition, Tucker-2 decomposition, RESCAL, etc.). In various embodiments, decomposition of the three mode tensor results in an item matrix including embeddings for each item from the three mode tensor and a user tensor corresponding to the user embeddings. Different rows in the item matrix correspond to item embeddings for different products, while different slices of the user tensor correspond to user embeddings for different users. Generating the item embeddings and user embeddings from decomposition of the tensor results in the item embeddings and the user embeddings having a common latent space.

When the online concierge system receives a request for an order from a user, the online concierge system receives selections of items for inclusion in the order from the user. To simplify addition of items to the order, the online concierge system generates an order embedding from item embeddings of items that have been included in the order. For example, the order embedding is an average of item embeddings corresponding to items that have been included in the order. In some embodiments, the order embedding is a product of an average of item embeddings corresponding to items that have been included in the order and a user embedding of the user.

To recommend items for inclusion in the order, the online concierge system identifies a set of candidate items for evaluation from the order embedding. For example, the online concierge system partitions items offered by the warehouse identified by the request for the order into set of binary trees through any suitable method or combination of methods. The online concierge system identifies the order embedding and performs a nearest neighbor search through the set of binary trees to select items with the order embedding as the rood of the set of binary trees. The online concierge system determines distances between item embeddings of the selected items and the order embedding, ranks the selected items based on the distances between their item embedding and the order embedding and identifies the set of candidate items as selected items having at least a threshold position in the ranking or having less than a threshold distance between corresponding item embeddings and the order embedding. In other embodiments, the online concierge system determines distances between the order embedding and item embeddings for items offered by the warehouse identified in the request for the order (e.g., each item offered by the warehouse, a set of items offered by the warehouse) and identifies the set of candidate items as items having item embeddings within a threshold distance of the order embedding. In other embodiments, the online concierge system uses K-means clustering to cluster items offered by the warehouse identified by the request for an order based on item embeddings for the various items. Using K-means clustering causes an item to be clustered based on the distance of each dimension of an item embedding for the item to a mean value associated with a dimension across all item embeddings. For example, items having a value associated with a dimension of an item embedding that is within a specified distance to a mean value associated with the dimension are included in a cluster. The online concierge system generates a cluster embedding for each cluster, with a cluster embedding for a cluster comprising an average of item embeddings of items included in the cluster. In various embodiments, the online concierge system identifies the set of candidate items as items included in one or more clusters having cluster embeddings less than a threshold distance from the order embedding or included in one or more clusters having at least a threshold position in a ranking of clusters based on distances between cluster embeddings and the order embeddings. Additionally, the online concierge system may apply one or more diversity criteria when identifying the set of candidate items, such as including a threshold number of items having item embeddings greater than a threshold distance from the order embedding. Further, in various embodiments, the online concierge system uses any suitable method, or combination of methods, to identify the set of candidate items.

The online concierge system generates a score for each candidate item based on the item embedding for a candidate item and the order embedding. For example, the score is a dot product of the order embedding and an item embedding for a candidate item. In another embodiment, the score is determined from as a product of the order embedding and a transpose of the item embedding for a candidate item. From the scores for candidate items, the online concierge system selects one or more candidate items and transmits information identifying the one or more candidate items to a client device of the user for display. In various embodiments, the online concierge system transmits an interface to the client device of the user identifying items include in the order and displaying information identifying the selected one or more candidate items. Interface elements may be displayed proximate to each of the selected one or more candidate items, allowing the user to include a selected candidate item in the order by selecting the interface element proximate to the selected candidate item. This allows the interface to identify additional items, the selected one or more candidate items, that may complement the items included in the order based on cooccurrences of items in orders from users of the online concierge system and cooccurrences of items in orders from the user of the online concierge system from whom the request for the order ware received and items currently included in the order.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
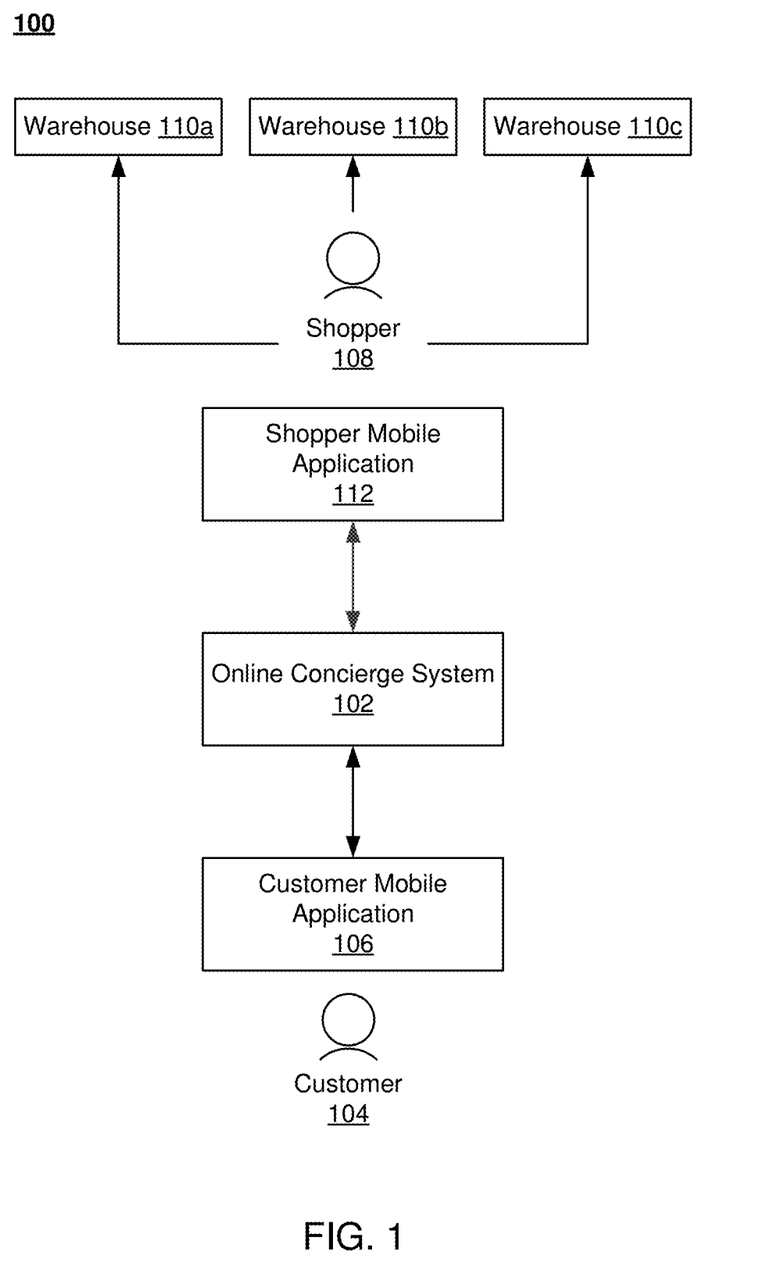
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The system 102 is configured to receive orders from one or more users 104 (only one is shown for the sake of simplicity). An order specifies a list of goods (items or products) to be delivered to the user 104. The order also specifies the location to which the goods are to be delivered, and a time window during which the goods should be delivered. In some embodiments, the order specifies one or more retailers from which the selected items should be purchased. The user may use a customer mobile application (CMA) 106 to place the order; the CMA 106 is configured to communicate with the online concierge system 102.

The online concierge system 102 is configured to transmit orders received from users 104 to one or more shoppers 108. A shopper 108 may be a contractor, employee, other person (or entity), robot, or other autonomous device enabled to fulfill orders received by the online concierge system 102. The shopper 108 travels between a warehouse and a delivery location (e.g., the user's home or office). A shopper 108 may travel by car, truck, bicycle, scooter, foot, or other mode of transportation. In some embodiments, the delivery may be partially or fully automated, e.g., using a self-driving car. The environment 100 also includes three warehouses 110a, 110b, and 110c (only three are shown for the sake of simplicity; the environment could include hundreds of warehouses). The warehouses 110 may be physical retailers, such as grocery stores, discount stores, department stores, etc., or non-public warehouses storing items that can be collected and delivered to users. Each shopper 108 fulfills an order received from the online concierge system 102 at one or more warehouses 110, delivers the order to the user 104, or performs both fulfillment and delivery. In one embodiment, shoppers 108 make use of a shopper mobile application 112 which is configured to interact with the online concierge system 102.

Figure 2:
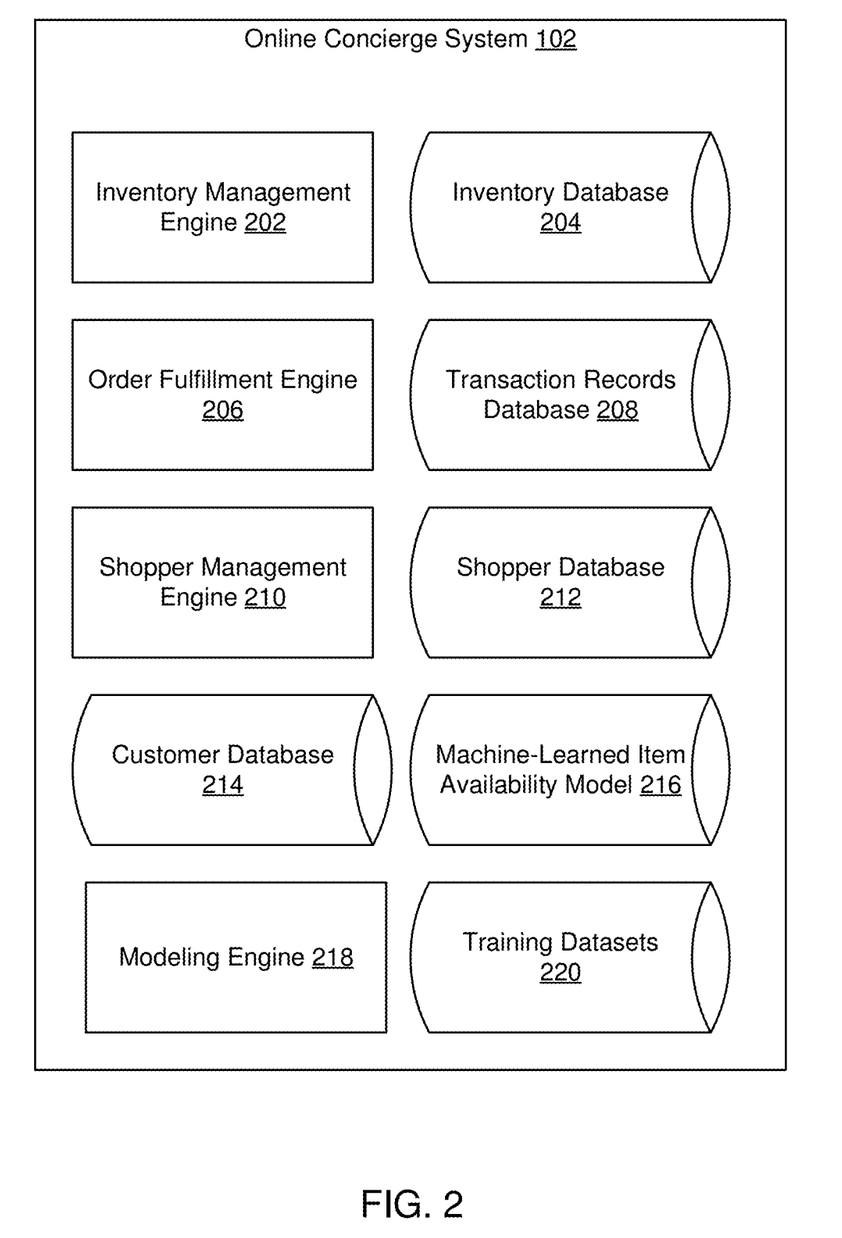
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204. Additional inventory information useful for predicting the availability of items may also be stored in the inventory database 204. For example, for each item-warehouse combination (a particular item at a particular warehouse), the inventory database 204 may store a time that the item was last found, a time that the item was last not found (a shopper looked for the item but could not find it), the rate at which the item is found, and the popularity of the item.

Inventory information provided by the inventory management engine 202 may supplement the training datasets 220. Inventory information provided by the inventory management engine 202 may not necessarily include information about the outcome of picking a delivery order associated with the item, whereas the data within the training datasets 220 is structured to include an outcome of picking a delivery order (e.g., if the item in an order was picked or not picked).

The online concierge system 102 also includes an order fulfillment engine 206 which is configured to synthesize and display an ordering interface to each user 104 (for example, via the customer mobile application 106). The order fulfillment engine 206 is also configured to access the inventory database 204 in order to determine which products are available at which warehouse 110. The order fulfillment engine 206 may supplement the product availability information from the inventory database 204 with an item availability predicted by the machine-learned item availability model 216. The order fulfillment engine 206 determines a sale price for each item ordered by a user 104. Prices set by the order fulfillment engine 206 may or may not be identical to in-store prices determined by retailers (which is the price that users 104 and shoppers 108 would pay at the retail warehouses). The order fulfillment engine 206 also facilitates transactions associated with each order. In one embodiment, the order fulfillment engine 206 charges a payment instrument associated with a user 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and user 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse to fulfill the order based on one or more parameters, such as a probability of item availability determined by a machine-learned item availability model 216, the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the user 104), his/her familiarity level with that particular warehouse 110, and so on. Additionally, the shopper management engine 210 accesses a shopper database 212 which stores information describing each shopper 108, such as his/her name, gender, rating, previous shopping history, and so on.

As part of fulfilling an order, the order fulfillment engine 206 and/or shopper management engine 210 may access a user database 214 which stores information describing each user. This information could include each user's name, address, gender, shopping preferences, favorite items, stored payment instruments, and so on.

In various embodiments, the order fulfillment engine 206 obtains information describing an order being created by a user and selects one or more candidate items for recommendation to the user to include in an order. As further described below in conjunction with FIG. 5, as a user creates an order, the order fulfillment engine 206 generates an order embedding for the order from item embeddings for items currently included in the order. The order fulfillment engine 206 also identifies a set of candidate items of items offered by a warehouse 110 identified in the order. In various embodiments, the order fulfillment engine 206 identifies candidate items as items having item embeddings within a threshold distance of the order embedding. For each candidate item of the set, the order fulfillment engine 206 determines a score based on a measure of similarity between the order embedding and the item embedding for a candidate item. Based on the score for each candidate item of the set, the order fulfillment engine 206 selects one or more candidate items, such as candidate items having at least a threshold position in a ranking of the candidate items based on their scores. The order fulfillment engine 206 includes information identifying the selected one or more candidate items in an interface along with items already included in the order by the user, surfacing the selected one or more candidate items to the user to simplify inclusion of one or more of the candidate items in the order being created by the user.

Machine Learning Models

The online concierge system 102 further includes a machine-learned item availability model 216, a modeling engine 218, and training datasets 220. The modeling engine 218 uses the training datasets 220 to generate the machine-learned item availability model 216. The machine-learned item availability model 216 can learn from the training datasets 220, rather than follow only explicitly programmed instructions. The inventory management engine 202, order fulfillment engine 206, and/or shopper management engine 210 can use the machine-learned item availability model 216 to determine a probability that an item is available at a warehouse 110. The machine-learned item availability model 216 may be used to predict item availability for items being displayed to or selected by a user or included in received delivery orders. A single machine-learned item availability model 216 is used to predict the availability of any number of items.

The machine-learned item availability model 216 can be configured to receive as inputs information about an item, the warehouse for picking the item, and the time for picking the item. The machine-learned item availability model 216 may be adapted to receive any information that the modeling engine 218 identifies as indicators of item availability. At minimum, the machine-learned item availability model 216 receives information about an item-warehouse pair, such as an item in a delivery order and a warehouse at which the order could be fulfilled. Items stored in the inventory database 204 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 204. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 204 and/or warehouse database and provide this extracted information as inputs to the item availability model 216.

The machine-learned item availability model 216 contains a set of functions generated by the modeling engine 218 from the training datasets 220 that relate the item, warehouse, and timing information, and/or any other relevant inputs, to the probability that the item is available at a warehouse. Thus, for a given item-warehouse pair, the machine-learned item availability model 216 outputs a probability that the item is available at the warehouse. The machine-learned item availability model 216 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 216 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper, or predicted to be unavailable but found by the shopper). In some examples, the confidence score is based in part on the age of the data for the item, e.g., if availability information has been received within the past hour, or the past day. The set of functions of the item availability model 216 may be updated and adapted following retraining with new training datasets 220. The machine-learned item availability model 216 may be any machine learning model, such as a neural network, boosted tree, gradient boosted tree or random forest model. In some examples, the machine-learned item availability model 216 is generated from XGBoost algorithm.

The item probability generated by the machine-learned item availability model 216 may be used to determine instructions delivered to the user 104 and/or shopper 108, as described in further detail below.

The training datasets 220 relate a variety of different factors to known item availabilities from the outcomes of previous delivery orders (e.g. if an item was previously found or previously unavailable). The training datasets 220 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 220 includes the outcome of a previous delivery order (e.g., if the item was picked or not). The item characteristics may be determined by the machine-learned item availability model 216 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 216 may weight these factors differently, where the weights are a result of a "learning" or training process on the training datasets 220. The training datasets 220 are very large datasets taken across a wide cross section of warehouses, shoppers, items, warehouses, delivery orders, times and item characteristics. The training datasets 220 are large enough to provide a mapping from an item in an order to a probability that the item is available at a warehouse. In addition to previous delivery orders, the training datasets 220 may be supplemented by inventory information provided by the inventory management engine 202. In some examples, the training datasets 220 are historic delivery order information used to train the machine-learned item availability model 216, whereas the inventory information stored in the inventory database 204 include factors input into the machine-learned item availability model 216 to determine an item availability for an item in a newly received delivery order. In some examples, the modeling engine 218 may evaluate the training datasets 220 to compare a single item's availability across multiple warehouses to determine if an item is chronically unavailable. This may indicate that an item is no longer manufactured. The modeling engine 218 may query a warehouse 110 through the inventory management engine 202 for updated item information on these identified items.

Additionally, the modeling engine 218 generates user embeddings for users of the online concierge system 102 and items offered for purchase by one or more warehouses 110. As further described below in conjunction with FIG. 5, in various embodiments, the modeling engine 218 generates a multi-dimensional tensor, such as a tensor with greater than two dimensions, from previously fulfilled orders included in the transaction records database 208. In embodiments where a three mode tensor is generated, a mode, or a dimension, of the three mode tensor corresponds to users of the online concierge system 102. The remaining modes, or dimensions, of the three mode tensor each correspond to products offered. For example, two of the modes of the three mode tensor correspond to items offered for purchase by a warehouse 110, such as a warehouse 110 selected by a user. Each element in the three mode tensor represents a number of times two products, corresponding to two modes of the tensor, have both been included in orders received from a user corresponding to the remaining mode of the tensor. For example, each element of the three mode tensor corresponds to an identifier of a user, an identifier of an item, and an identifier of another item. A value of an element of the three mode tensor for an identifier of a user, an identifier of an item, and the identifier of an additional item specifies a number of times the user corresponding to the identifier has included both the item and the additional item in one or more orders that were fulfilled by the online concierge system. This allows the online concierge system to model triplets of a user, an item, and an additional item that track co-occurrences of pairs the item and the additional item in orders fulfilled for various users, while maintaining information describing inclusion of items in orders for different users. In other embodiments, the online concierge system generates a tensor having any suitable number of modes.

The modeling engine 218 applies one or more tensor decomposition methods to the tensor, generating item embeddings and user embeddings from the tensor. Decomposing the generated tensor allows the user embeddings and the item embeddings to occupy a common latent space. For example, the modeling engine 218 decomposes a generated three mode tensor using any suitable tensor decomposition method, or combination of tensor decomposition methods to the three mode tensor (e.g., Tucker decomposition, Tucker-2 decomposition, RESCAL, etc.). Decomposition of the three mode tensor results in an item matrix, where each row of the item matrix corresponds to an item embedding for a different item, and a user tensor, where each slice of the user tensor corresponds to a user embedding for a user. The item matrix, and the item embeddings comprising the item matrix, is shared across users of the online concierge system 102, while the user embeddings from the user tensor each capture interactions between items that cooccur in orders received from different users.

Machine Learning Factors

The training datasets 220 include a time associated with previous delivery orders. In some embodiments, the training datasets 220 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 220 include a day of the week previous delivery orders were placed. The day of the week may impact item availability, since popular shopping days may have reduced inventory of items or restocking shipments may be received on particular days. In some embodiments, training datasets 220 include a time interval since an item was previously picked in a previously delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 220 include a time interval since an item was not found in a previous delivery order. If there has been a short time interval since an item was not found, this may indicate that there is a low probability that the item is available in subsequent delivery orders. And conversely, if there is has been a long time interval since an item was not found, this may indicate that the item may have been restocked and is available for subsequent delivery orders. In some examples, training datasets 220 may also include a rate at which an item is typically found by a shopper at a warehouse, a number of days since inventory information about the item was last received from the inventory management engine 202, a number of times an item was not found in a previous week, or any number of additional rate or time information. The relationships between this time information and item availability are determined by the modeling engine 218 training a machine learning model with the training datasets 220, producing the machine-learned item availability model 216.

The training datasets 220 include item characteristics. In some examples, the item characteristics include a department associated with the item. For example, if the item is yogurt, it is associated with the dairy department. The department may be the bakery, beverage, nonfood and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability, since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 202. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 218 training a machine learning model with the training datasets 220, producing the machine-learned item availability model 216.

The training datasets 220 may include additional item characteristics that affect the item availability and can therefore be used to build the machine-learned item availability model 216 relating the delivery order for an item to its predicted availability. The training datasets 220 may be periodically updated with recent previous delivery orders. The training datasets 220 may be updated with item availability information provided directly from shoppers 108, as described in further detail with reference to FIG. 5. Following updating of the training datasets 220, a modeling engine 218 may retrain a model with the updated training datasets 220 and produce a new machine-learned item availability model 216.

Customer Mobile Application

Figure 3A:
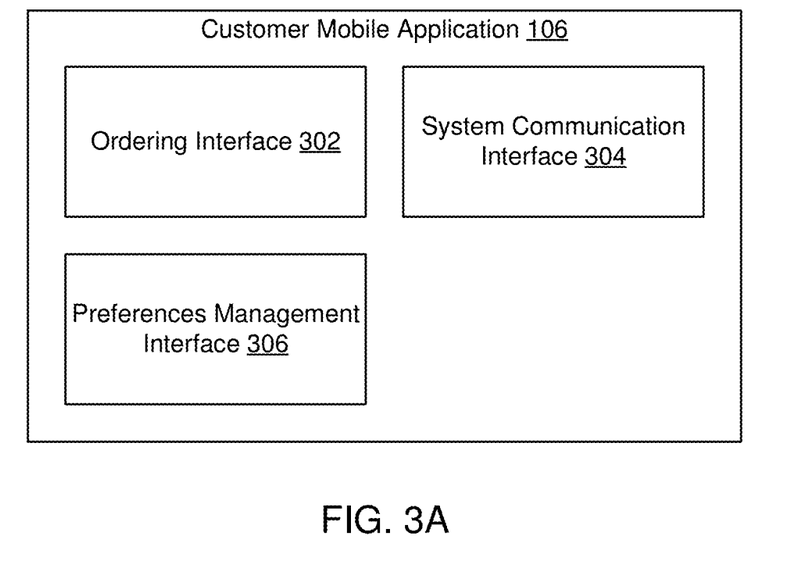
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the user 104 can browse through and select products and place an order. The CMA 106 also includes a system communication interface 304 which, among other functions, receives inventory information from the online shopping concierge system 102 and transmits order information to the system 102. The CMA 106 also includes a preferences management interface 306 which allows the user 104 to manage basic information associated with his/her account, such as his/her home address and payment instruments. The preferences management interface 306 may also allow the user to manage other details such as his/her favorite or preferred warehouses 110, preferred delivery times, special instructions for delivery, and so on.

Shopper Mobile Application

Figure 3B:
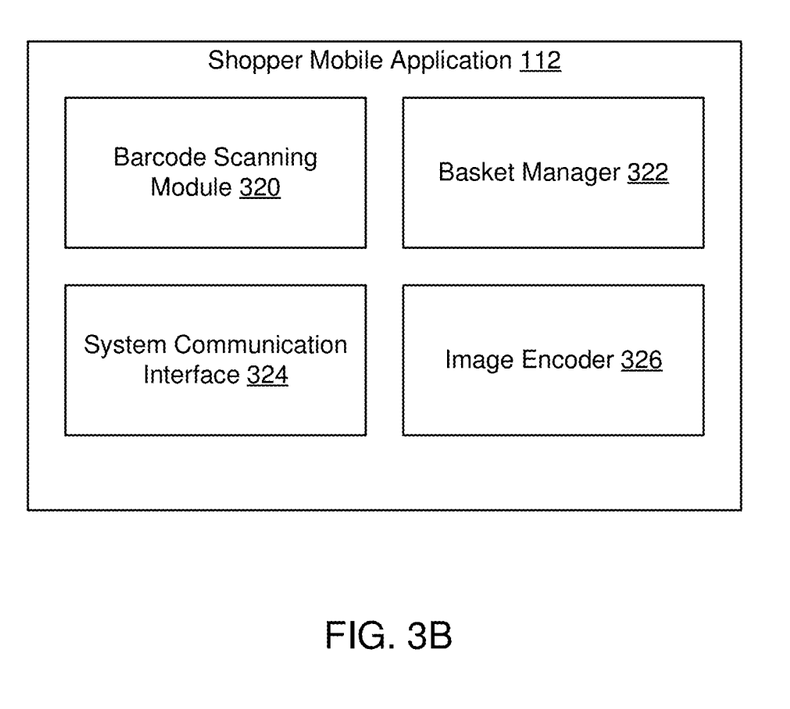
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from the system 102 and transmits the contents of a basket of items to the system 102. The SMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Predicting Inventory Availability

Figure 4:
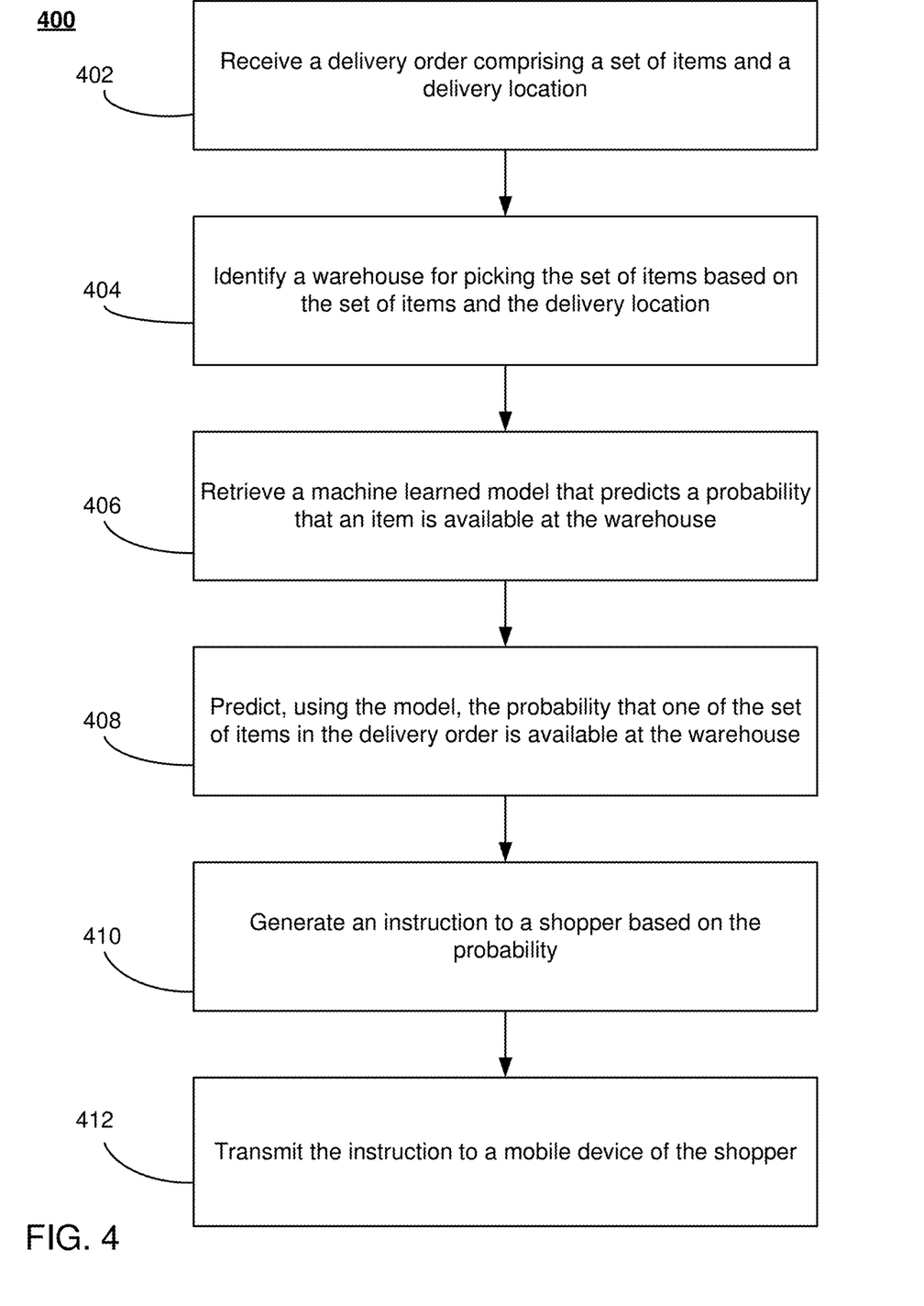
FIG. 4 is a flowchart of a process for predicting inventory availability, according to one embodiment.

As described with reference to FIG. 2, the machine-learned item availability model 216 of the online concierge system 102 can determine an availability of an item requested by the user 104. FIG. 4 is a flowchart illustrating a process 400 for predicting inventory availability, according to one embodiment. The online concierge system 102 receives 402 a delivery order that includes a set of items and a delivery location. The delivery location may be any location associated with a user, such as a user's home or office. The delivery location may be stored with the user location in the user database 214. Based on the delivery order, the online concierge system 102 identifies a warehouse 404 for picking the set of items in the delivery order based on the set of items and the delivery location. In some cases, the user specifies a particular warehouse or set of warehouses (e.g., a particular grocery store or chain of grocery stores) in the order. In other cases, the online concierge system 102 selects the warehouse based on the items and the delivery location. In some examples, there are a number of different possible warehouses that the set of items may be picked from. The warehouses may be identified by the order fulfillment engine 206 based on warehouses stored by the inventory management engine 202, and warehouses are identified with a suitable inventory and within a threshold distance of the delivery address. In some embodiments, a single delivery order can be split into multiple orders and picked at multiple warehouses, e.g., if the items cannot be fulfilled at a single warehouse. In this example, each possible warehouse is input into the machine-learned item availability model 216.

After the warehouses are identified, the online concierge system 102 retrieves 406 the machine-learned item availability model 216 that predicts a probability that an item is available at the warehouse. The items in the delivery order and the identified warehouses are input into the machine-learned item availability model 216. For example, the online concierge system 102 may input the item, warehouse, and timing characteristics for each item-warehouse pair into the machine-learned item availability model 216 to assess the availability of each item in the delivery order at each potential warehouse at a particular day and/or time. The machine-learned item availability model 216 predicts 408 the probability that one of the set of items in the delivery order is available at the warehouse. If a number of different warehouses are identified 404, then the machine-learned item availability model 216 predicts the item availability for each one. In some examples, the probability that an item is available includes a probability confidence score generated by the machine-learned item availability model 216.

The order fulfillment engine 206 uses the probability to generate 410 an instruction to a shopper. The order fulfillment engine 206 transmits the instruction to the shopper through the SMA 112 via the shopper management engine 210. The instruction is based on the predicted probability. In some examples, the shopper management engine 210 instructs the shopper to pick an item in the delivery order at a warehouse with the highest item availability score. For example, if a warehouse is more likely to have more items in the delivery order available than another warehouse, then the shopper management engine 210 instructs the shopper to pick the item at the warehouse with better availability.

Figure 5:
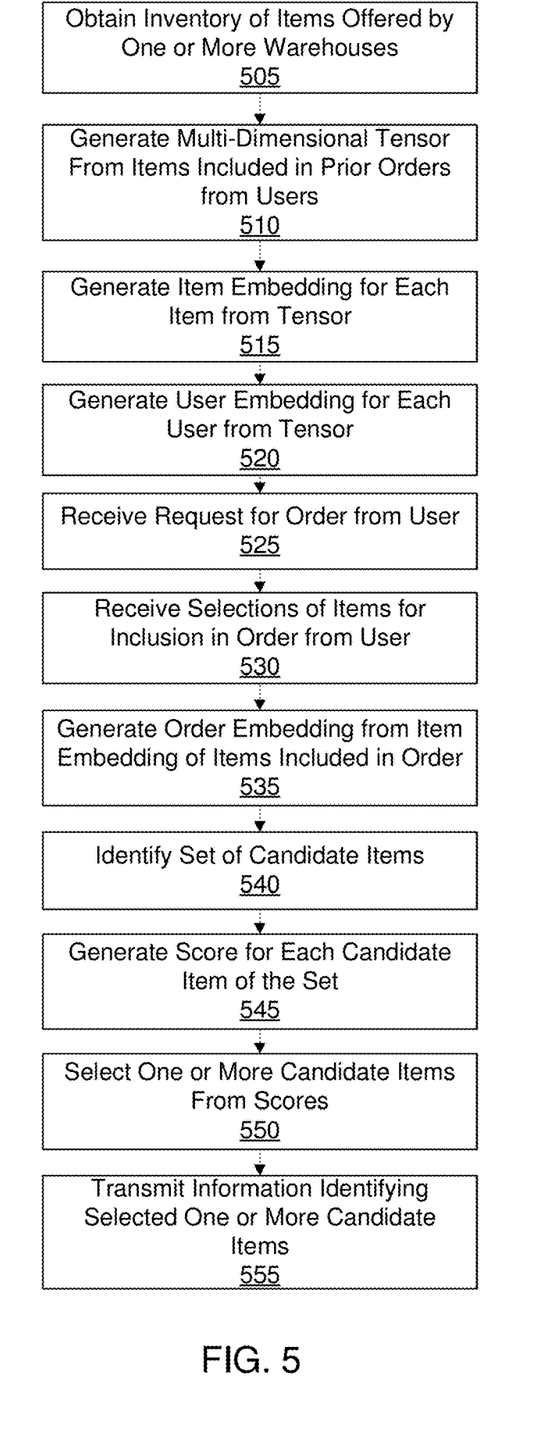
FIG. 5 is a flowchart of a method for selecting additional items for recommendation to a user from items included in an order from the user and cooccurrences of items in received orders, according to one embodiment.

Recommending Items to an Online Concierge System User from Cooccurrences of Items in Received Orders and Items Included in an Order from the User FIG. 5 is a flowchart of one embodiment of a method for recommending items to a user of an online concierge system 102 accounting for the user's for selecting additional items for recommendation to a user of an online concierge system 102 from items included in an order from the user and cooccurrences of items in received orders probability of purchasing items. In various embodiments, the method includes different or additional steps than those described in conjunction with FIG. 5. Further, in some embodiments, the steps of the method may be performed in different orders than the order described in conjunction with FIG. 5. The method described in conjunction with FIG. 5 may be carried out by the online concierge system 102 in various embodiments.

The online concierge system 102 obtains 505 an inventory of items offered by one or more warehouses 110. In some embodiments, the online concierge system 102 obtains 505 an inventory from each warehouse 110, with an inventory from a warehouse identifying items offered by the warehouse 110. The inventory includes different entries, with each entry including information identifying an item (e.g., an item identifier, an item name) and one or more attributes of the item. Example attributes of an item include: one or more keywords, a brand offering the item, a manufacturer of the item, a type of the item, a price of the item, a quantity of the item, a size of the item and any other suitable information. Additionally, one or more attributes of an item may be specified by the online concierge system 102 for the item and included in the entry for the item in the inventory. Example attributes specified by the online concierge system 102 for an item include: a category for the item, one or more sub-categories for the item, and any other suitable information for the item.

From information describing prior orders received from users of the online concierge system 102, the online concierge system generates 510 tensor having more than two modes (i.e., more than two dimensions), such as a three mode tensor (i.e., a three dimensional array). In embodiments where a three mode tensor is generated 510, a mode, or a dimension, of the three mode tensor corresponds to users of the online concierge system 102. The remaining modes, or dimensions, of the three mode tensor each correspond to products offered. For example, two of the modes of the three mode tensor correspond to items offered for purchase by a warehouse 110, such as a warehouse 110 selected by a user. Each element in the three mode tensor represents a number of times two products, corresponding to two modes of the tensor, have both been included in orders received from a user corresponding to the remaining mode of the tensor. For example, each element of the three mode tensor corresponds to an identifier of a user, an identifier of an item, and an identifier of another item. A value of an element of the three mode tensor for an identifier of a user, an identifier of an item, and the identifier of an additional item specifies a number of times the user corresponding to the identifier has included both the item and the additional item in one or more orders that were received by the online concierge system 102. This allows the online concierge system to model triplets of a user, an item, and an additional item that track co-occurrences of pairs the item and the additional item in orders received from various users, while maintaining information describing inclusion of items in orders for different users. In other embodiments, the online concierge system 102 generates 510 a tensor having any suitable number of modes.

From the tensor, the online concierge system 102 generates 515 an item embedding for each item and generates 520 a user embedding for each user. In various embodiments, the online concierge system 102 applies one or more tensor decomposition methods to the generated tensor to generate 515 item embeddings for various items and to generate 520 user embeddings for various users through. For example, the online concierge system 102 generates 510 a three mode tensor, as further described above, and decomposes the three mode tensor using any suitable tensor decomposition method, or combination of tensor decomposition methods to the three mode tensor (e.g., Tucker decomposition, Tucker-2 decomposition, RESCAL, etc.). Decomposition of the three mode tensor results in an item matrix, where each row of the item matrix corresponds to an item embedding for a different item, and a user tensor, where each slice of the user tensor corresponds to a user embedding for a user. The item matrix, and the item embeddings comprising the item matrix, is shared across users of the online concierge system 102, while the user embeddings from the user tensor each capture interactions between items that cooccur in orders received from different users. Generating the item embeddings and the user embeddings by decomposition of the generated tensor results in item embeddings having a common latent space with the user embeddings.

Figure 6:
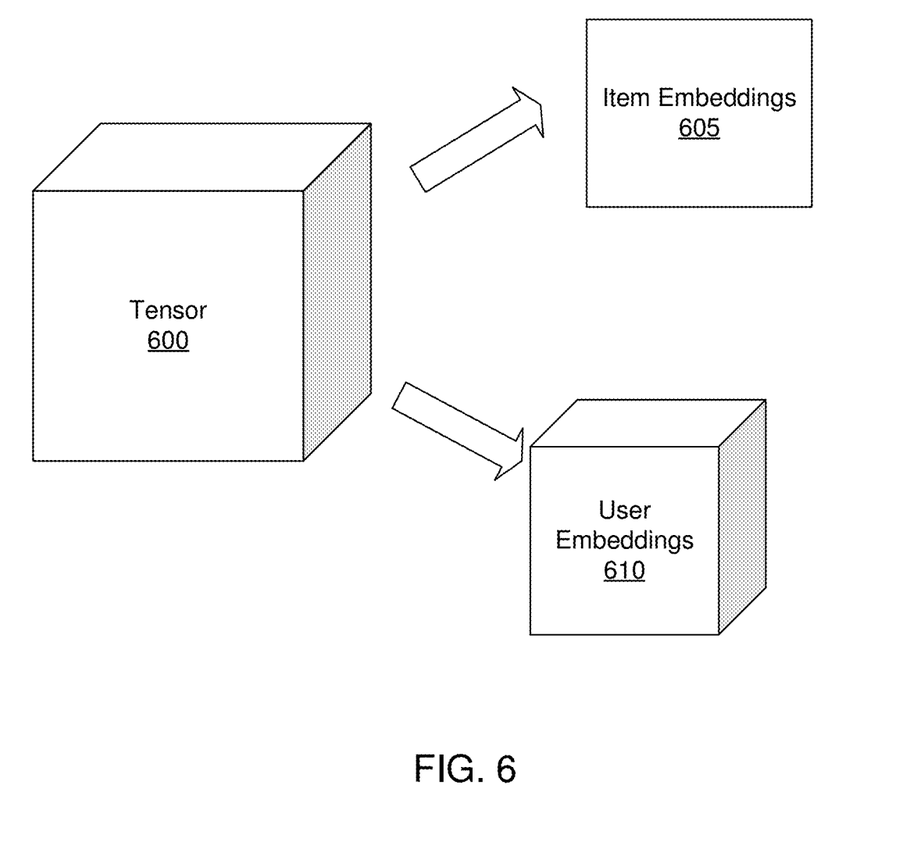
FIG. 6 is a conceptual diagram of generating item embeddings and user embeddings from a tensor, in accordance with an embodiment.

FIG. 6 shows a conceptual diagram of generating item embeddings and user embeddings from a tensor 600. As further described above in conjunction with FIG. 5, the tensor 600 shown in FIG. 6 is a three-dimensional tensor, with a dimension corresponding to users and two dimensions each corresponding to products offered by a warehouse 110 (or by the online concierge system). An element of the tensor 600 corresponding to a user identifier, an item identifier, and an additional item identifier includes a value indicating a number of times the online concierge system 102 received an order from a user corresponding to the user identifier that included both the item corresponding to the item identifier and the additional item corresponding to the additional item identifier.

To generate user embeddings and item embeddings, the online concierge system 102 applies one or more tensor decomposition methods to the tensor 600. Application of one or more tensor decomposition methods to the tensor 600 results in a matrix including item embeddings 605 and a tensor including user embeddings 610. Each row of the matrix including item embeddings 605 is an item embedding for a particular item. Similarly, each slice of the tensor including user embeddings 610 corresponds to a user embedding for a user. The item embeddings 605 and the user embeddings 610 are in a common latent space from decomposition of the tensor 600, with a user embedding 610 providing information describing items purchased by a specific user corresponding to the user embedding 610.

Referring back to FIG. 5, when the online concierge system 102 receives 525 a request for an order from a user, the online concierge system 102 receives 530 selections of items for inclusion in the order from the user. For example, the request for the order identifies a warehouse 110 for fulfilling the order and the online concierge system 102 subsequently receives 530 selections of items offered by the warehouse 110 for inclusion in the order. The online concierge system 102 stores identifiers of the selected items in association with an identifier of the order to create the order.

However, to add items to the order, the user navigates through an inventory of items offered by the warehouse 110 or provides search queries to the online concierge system 102 to identify different items offered by the warehouse 110. To allow the user to more easily identify items for inclusion in an order, the online concierge system 102 leverages the generated item embeddings and the user embedding generated 520 for the user. The online concierge system 102 identifies items included in the order by the user and retrieves item embeddings for the items included in the order. From the item embeddings for items included in the order, the online concierge system 102 generates 535 an order embedding for the order. In some embodiments, the online concierge system 102 generates 535 the order embedding as a product of an average of item embeddings corresponding to items that have been included in the order and a user embedding for the user.

To recommend items for inclusion in the order, the online concierge system 102 identifies 540 a set of candidate items for evaluation from the order embedding. For example, the online concierge system 102 partitions items offered by the warehouse 110 identified by the request for the order into set of binary trees through any suitable method or combination of methods. The online concierge system 102 identifies the order embedding and performs a nearest neighbor search through the set of binary trees to select items with the order embedding as the rood of the set of binary trees. The online concierge system 102 determines distances between item embeddings of the selected items and the order embedding, ranks the selected items based on the distances between their item embedding and the order embedding and identifies 540 the set of candidate items as selected items having at least a threshold position in the ranking or having less than a threshold distance between corresponding item embeddings and the order embedding. In other embodiments, the online concierge system 102 determines distances between the order embedding and item embeddings for items offered by the warehouse 110 identified in the request for the order (e.g., each item offered by the warehouse 110, a set of items offered by the warehouse 110) and identifies 540 the set of candidate items as items having item embeddings within a threshold distance of the order embedding. In other embodiments, the online concierge system 102 uses K-means clustering to cluster items offered by the warehouse 110 identified by the request for an order based on item embeddings for the various items. Using K-means clustering causes an item to be clustered based on the distance of each dimension of an item embedding for the item to a mean value associated with a dimension across all item embeddings. For example, items having a value associated with a dimension of an item embedding that is within a specified distance to a mean value associated with the dimension are included in a cluster. The online concierge system 102 generates a cluster embedding for each cluster, with a cluster embedding for a cluster comprising an average of item embeddings of items included in the cluster. In various embodiments, the online concierge system 102 identifies 540 the set of candidate items as items included in one or more clusters having cluster embeddings less than a threshold distance from the order embedding or included in one or more clusters having at least a threshold position in a ranking of clusters based on distances between cluster embeddings and the order embeddings. Additionally, the online concierge system 102 may apply one or more diversity criteria when identifying 540 the set of candidate items, such as including a threshold number of items having item embeddings greater than a threshold distance from the order embedding. Further, in various embodiments, the online concierge system 102 uses any suitable method, or combination of methods, to identify 540 the set of candidate items.

For each of the set of candidate items, the online concierge system 102 generates 545 a score. In various embodiments, the online concierge system 102 generates 545 the score for a candidate item as a dot product of an item embedding for the candidate item and the order embedding. For example, the online concierge system 102 determines the score for a candidate item as a product of the order embedding and a transpose of the item embedding for a candidate item. In embodiments where the order embedding is an average of item embeddings for items included in the order, the online concierge system 102 determines a product of the order embedding and the user embedding and generates 545 the scores for candidate items of the set based on a dot product of the determined product of the order embedding and the user embedding and the item embedding of the candidate item. In other embodiments, the online concierge system 102 generates 545 the score for a candidate item from any suitable measure of similarity between the order embedding and an item embedding for the candidate item (e.g., cosine similarity, Euclidian distance, etc.).

From the scores for candidate items, the online concierge system 102 selects 550 one or more candidate items and transmits information identifying the one or more selected candidate items to a client device of the user for display. In various embodiments, the online concierge system 102 selects 550 candidate items having at least a threshold score. Alternatively, the online concierge system 102 ranks candidate items based on their scores (e.g., candidate items having higher scores have higher positions in the ranking) and selects 550 candidate items having at least a threshold position in the ranking.

In various embodiments, the online concierge system 102 transmits 555 an interface to the client device of the user identifying items included in the order and displaying information identifying the selected one or more candidate items. Interface elements may be displayed proximate to each of the selected one or more candidate items, allowing the user to include a selected candidate item in the order by selecting the interface element proximate to the selected candidate item. This allows the interface to identify additional items, the selected one or more candidate items, that may complement the items included in the order based on cooccurrences of items in orders from users of the online concierge system and cooccurrences of items in orders from the user of the online concierge system from whom the request for the order ware received and items currently included in the order. Including information identifying the selected one or more candidate items in the interface allows the user to more easily identify the selected candidate items, increasing a likelihood of the online concierge system 102 including one or more of the selected candidate items in the order.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method, performed at a computer system comprising a processor and a computer-readable medium, comprising:
    obtaining an inventory of items offered by one or more warehouses, the inventory identifying a warehouse offering an item and attributes of the item;
    retrieving prior orders received from users of the computer system, each order including one or more items;
    generating, from the prior orders, a tensor having more than two dimensions, each element of the tensor corresponding to a user, an item, and an additional item and having a value specifying a number of times the user corresponding to an identifier has included both the item and the additional item in one or more orders that were fulfilled by the computer system;
    applying a trained tensor decomposition model to the tensor to generate an item embedding for each item and a user embedding for each user, wherein the item embedding and the user embedding occupy a common latent space;
    receiving, via a user interface of a client device, a request from a user for an order, the request identifying the warehouse;
    receiving selections of one or more items included in the order from the user;
    generating an order embedding for the order from item embeddings for the one or more items included in the order;
    identifying a set of candidate items offered by the warehouse identified by the order;
    generating a score for each candidate item of the set, the score for a candidate item of the set based on the order embedding for the order and an item embedding of the candidate item;
    selecting one or more candidate items based on the generated scores; and
    transmitting an interface to the client device of the user including information describing the selected one or more candidate items.

2. The method of claim 1, wherein generating the order embedding for the order from item embeddings for the one or more items included in the order comprises:
    generating the order embedding as an average of the item embeddings for the one or more items included in the order.

3. The method of claim 2, wherein generating the score for each candidate item of the set, the score for the candidate item of the set based on the order embedding for the order and the item embedding of the candidate item comprises:
    determining a product of the order embedding and the user embedding for the user;
    determining the score for the candidate item of the set as a measure of similarity between the determined product and the item embedding for the candidate item of the set.

4. The method of claim 3, wherein the measure of similarity between the determined product and the item embedding for the candidate item of the set comprises a dot product between the determined product and the item embedding for the candidate item of the set.

5. The method of claim 1, wherein generating the order embedding for the order from item embeddings for the one or more items included in the order comprises:
    generating the order embedding as a product of an average of the item embeddings for the one or more items included in the order and the user embedding.

6. The method of claim 5, wherein generating the score for each candidate item of the set, the score for the candidate item of the set based on the order embedding for the order and the item embedding of the candidate item comprises:
    determining the score for a candidate item of the set as a measure of similarity between the order embedding and the item embedding for the candidate item of the set.

7. The method of claim 6, wherein the measure of similarity between the order embedding and the item embedding for the candidate item of the set comprises a dot product between the order embedding and the item embedding for the candidate item of the set.

8. The method of claim 1, wherein selecting one or more candidate items based on the generated scores comprises:
    ranking the candidate items of the set based on the generated scores; and selecting one or more candidate items of the set having at least a threshold position in the ranking.

9. The method of claim 1, wherein selecting one or more candidate items based on the generated scores comprises:
selecting one or more candidate items of the set having at least a threshold score.

10. The method of claim 1, wherein identifying the set of candidate items offered by the warehouse identified by the order comprises:
identifying items offered by the order having item embeddings within a threshold distance from the order embedding.

11. A computer program product comprising a non-transitory computer readable storage medium having instructions encoded thereon that, when executed by a processor, cause the processor to:
obtain, at a computer system, an inventory of items offered by one or more warehouses, the inventory identifying a warehouse offering an item and attributes of the item;
retrieve prior orders received from users of the computer system, each order including one or more items;
generate, from the prior orders, a tensor having more than two dimensions, each element of the tensor corresponding to a user, an item, and an additional item and having a value specifying a number of times the user corresponding to an identifier has included both the item and the additional item in one or more orders that were fulfilled by the computer system;
apply a trained tensor decomposition model to the tensor to generate an item embedding for each item and a user embedding for each user, wherein the item embedding and the user embedding occupy a common latent space;
receive, via a user interface of a client device, a request from a user for an order, the request identifying the warehouse;
receive selections of one or more items included in the order from the user;
generate an order embedding for the order from item embeddings for the one or more items included in the order;
identify a set of candidate items offered by the warehouse identified by the order;
generate a score for each candidate item of the set, the score for a candidate item of the set based on the order embedding for the order and an item embedding of the candidate item;
select one or more candidate items based on the generated scores; and
transmit an interface to the client device of the user including information describing the selected one or more candidate items.

12. The computer program product of claim 11, wherein generate the order embedding for the order from item embeddings for the one or more items included in the order comprises:
generate the order embedding as an average of the item embeddings for the one or more items included in the order.

13. The computer program product of claim 12, wherein generate the score for each candidate item of the set, the score for the candidate item of the set based on the order embedding for the order and the item embedding of the candidate item comprises:
determine a product of the order embedding and the user embedding for the user;
determine the score for the candidate item of the set as a measure of similarity between the determined product and the item embedding for the candidate item of the set.

14. The computer program product of claim 13, wherein the measure of similarity between the determined product and the item embedding for the candidate item of the set comprises a dot product between the determined product and the item embedding for the candidate item of the set.

15. The computer program product of claim 11, wherein generate the order embedding for the order from item embeddings for the one or more items included in the order comprises:
generate the order embedding as a product of an average of the item embeddings for the one or more items included in the order and the user embedding.

16. The computer program product of claim 15, wherein generate the score for each candidate item of the set, the score for the candidate item of the set based on the order embedding for the order and the item embedding of the candidate item comprises:
determine the score for a candidate item of the set as a measure of similarity between the order embedding and the item embedding for the candidate item of the set.

17. The computer program product of claim 16, wherein the measure of similarity between the order embedding and the item embedding for the candidate item of the set comprises a dot product between the order embedding and the item embedding for the candidate item of the set.

18. The computer program product of claim 11, wherein select one or more candidate items based on the generated scores comprises:
rank the candidate items of the set based on the generated scores; and
select one or more candidate items of the set having at least a threshold position in the ranking.

19. The computer program product of claim 11, wherein select one or more candidate items based on the generated scores comprises:
select one or more candidate items of the set having at least a threshold score.

20. The computer program product of claim 11, wherein identifying the set of candidate items offered by the warehouse identified by the order comprises:
identify items offered by the order having item embeddings within a threshold distance from the order embedding.

* * * * *